United States Patent [19]
Altschuler et al.

[11] Patent Number: 5,465,300
[45] Date of Patent: Nov. 7, 1995

[54] SECURE COMMUNICATION SETUP METHOD

[75] Inventors: Barry N. Altschuler, Scottsdale; Douglas A. Hardy, Mesa; James A. Stephens, Chandler; Joseph Kish, III, Gilbert, all of Ariz.

[73] Assignee: Motorola, Inc., Schaumburg, Ill.

[21] Appl. No.: 172,971

[22] Filed: Dec. 27, 1993

[51] Int. Cl.⁶ .................................................. H04L 9/30
[52] U.S. Cl. ............................ 380/30; 380/21; 380/25; 380/49
[58] Field of Search .............................. 380/21, 23–25, 380/49, 30

[56] References Cited

U.S. PATENT DOCUMENTS

| | | | |
|---|---|---|---|
| 4,578,531 | 2/1986 | Everhart et al. | 380/21 |
| 4,802,220 | 1/1989 | Marker, Jr. | 380/49 |
| 4,888,801 | 12/1989 | Foster et al. | 380/21 |
| 4,888,802 | 12/1989 | Cooney | 380/49 |
| 4,924,514 | 5/1990 | Matyas et al. | 380/24 |
| 4,941,176 | 7/1990 | Matyas et al. | 380/21 |
| 4,989,211 | 1/1991 | Weng | 371/42 |
| 5,003,593 | 3/1991 | Mihm, Jr. | 380/21 |
| 5,010,572 | 4/1991 | Bathrick et al. | 380/21 |
| 5,029,206 | 7/1991 | Marino, Jr. et al. | 380/4 |
| 5,093,860 | 3/1992 | Steinbrenner et al. | 380/21 |
| 5,103,478 | 4/1992 | Matyas et al. | 380/25 |
| 5,179,591 | 1/1993 | Hardy et al. | 380/21 |
| 5,193,114 | 3/1993 | Moseley | 380/23 |

*Primary Examiner*—Salvatore Cangialosi
*Attorney, Agent, or Firm*—Frank J. Bogacz

[57] ABSTRACT

A call is connected between secure terminals (16) through a network (12). If a network address for the call is included on an approved list (46), a secure call setup procedure (54) is performed automatically. One terminal (16) automatically sends an auto-secure signal. If the other terminal detects the auto-secure signal, secure call setup procedure (54) is performed automatically. The secure call setup procedure (54) determines a current user-identity for the opposing party. If the current user-identity corresponds to a user-identity included on an approved list (76), an abbreviated secure call setup process (80) is performed. If the current user identity is not approved, a full secure call setup process (78) is performed. The abbreviated process (80) differs from the full process (78) in that it uses a traffic key obtained from a prior secure communication session and may be performed more quickly.

12 Claims, 7 Drawing Sheets

| APPROVED LIST 76 / 44 / 82 / 84 | | | |
|---|---|---|---|
| 46 — NETWORK ADDRESS | USER-IDENTITY | AUTHENTICATION | TRAFFIC KEY |
| | ⋮ | ⋮ | ⋮ |
| | USER-IDENTITY | AUTHENTICATION | TRAFFIC KEY |
| | ⋮ | ⋮ | ⋮ |
| | USER-IDENTITY | AUTHENTICATION | TRAFFIC KEY |
| NETWORK ADDRESS | ⋮ | ⋮ | ⋮ |
| | USER-IDENTITY | AUTHENTICATION | TRAFFIC KEY |

*FIG. 4*

SECURE COMMUNICATION SETUP METHOD

RELATED PATENT

The present invention is related to "Method For Algorithm Independent Cryptographic Key Management," by Douglas A. Hardy et al., U.S. Pat. No. 5,179,591, assigned to the assignee of the present patent, and incorporated herein by reference.

TECHNICAL FIELD OF THE INVENTION

The present invention relates generally to secure communication procedures. More specifically, the present invention relates to setup procedures performed prior to engaging in an encrypted communication session.

BACKGROUND OF THE INVENTION

Those who use communication services may employ a wide variety of cryptographic techniques and corresponding devices to engage in secure communication sessions. In a typical scenario, two parties first establish a "plaintext" or "clear" call through a telecommunications or other communication network. At this point, no significant encryption is being employed and clear, rather than secure, communications are taking place. One of the two parties may then cause the call to go secure. The devices through which communication services are being provided then engage in a secure call setup procedure. This procedure determines the capabilities of the devices, authenticates the callers, passes cryptographic keys, and synchronizes encryption and decryption algorithms. Upon completion of the secure call setup procedure, compatible cryptographic techniques are applied to the information communicated between the communicating devices, and a secure communication session takes place.

Unfortunately, this typical scenario causes some problems. For example, a human factor is involved in deciding when to go secure. If the parties to the call do not manually force the call to go secure, communications are conducted in the clear. This human factor forms a weak link in an overall security scheme. Often, choosing whether or not to go secure is not a clear decision. Confidential, secure, or privileged communications often take place in the clear before the parties to a call recognize that going secure would have been more appropriate. Moreover, when either party to a call may initiate the security provisions, the social decorum associated with determining who should be responsible for initiating security provisions is unclear. Consequently, both parties to a call may hesitate to initiate security provisions, and this hesitancy may lead to a security breach.

Furthermore, conventional secure call setup procedures are undesirably slow. The slowness results from a significant amount of data that are communicated between the terminals during the secure call setup procedure. In addition, slow and cumbersome public encryption processes may be employed to protect cryptographic keys that are exchanged during the procedure. Often times, many seconds must transpire between the initiation of the secure call setup procedure and when the secure communication session may begin. In the course of a conversation, this several seconds may be harmful to the flow of a conversation and provides a subtle motivation against going secure. Moreover, it wastes resources and the time of the parties involved in a communication session.

SUMMARY OF THE INVENTION

Accordingly, it is an advantage of the present invention that an improved secure communication setup method is provided.

Another advantage is that the present invention provides procedures for going secure automatically in certain situations.

Another advantage is that the present invention may automatically initiate a secure communication session when an outgoing or incoming phone number matches a phone number included in an approved list.

Another advantage is that the present invention may include an auto-secure signal that is interpreted as a request for a remote terminal to automatically initiate a secure call setup procedure.

Another advantage is that the present invention may include an abbreviated secure call setup procedure that may be performed in a fraction of the time required for a full secure call setup procedure.

Another advantage is that the present invention may include an abbreviated secure call setup procedure that relies upon the protection of security provisions provided by a prior secure communication session to generate and exchange cryptographic keys for use in a subsequent secure communication session.

The above and other advantages of the present invention are carried out in one form by a method of engaging in a secure communication session with one of a plurality of remote terminals. The method calls for performing a full secure call setup process when no prior secure communication session has been conducted with the one remote terminal. An abbreviated secure call setup process is performed when a prior secure communication session has been conducted with the one remote terminal. The abbreviated secure call setup process is configured to be performed more quickly than the full secure call setup process.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 4 shows a block diagram of an approved list maintained in a memory of the secure terminal;

DETAILED DESCRIPTION OF THE PREFERRED EMBODIMENTS

Figure 1:
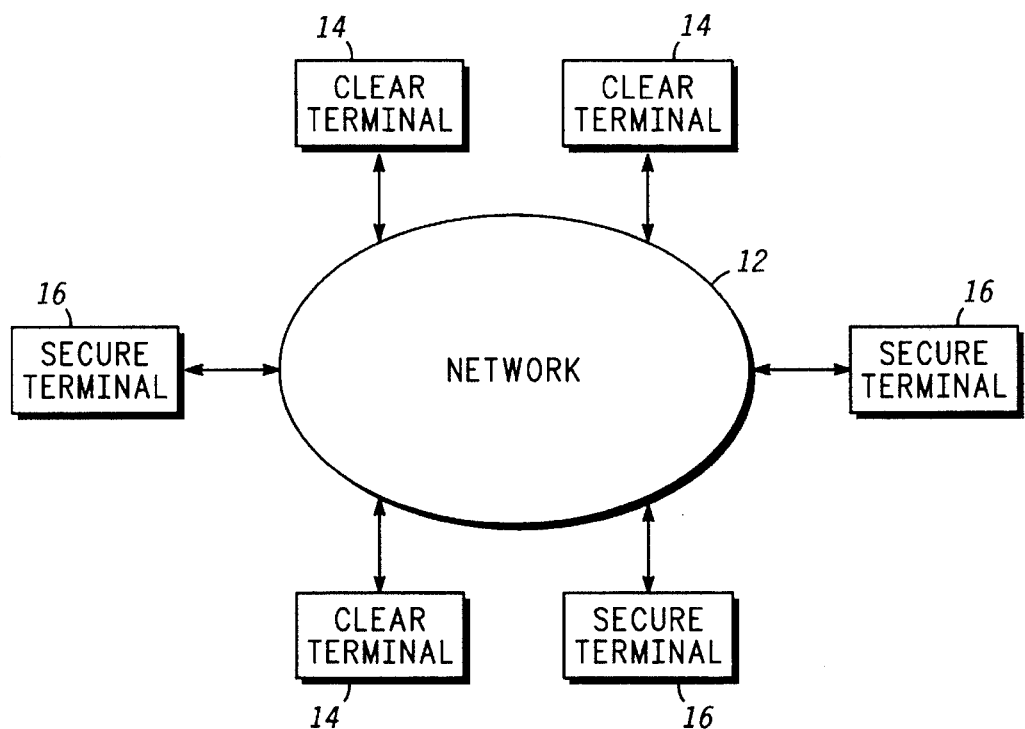
FIG. 1 shows a block diagram of an environment within which the present invention may be practiced.

FIG. 1 shows a block diagram of an environment 10 within which the present invention may be practiced. Environment 10 includes a network 12 to which any number of clear terminals 14 and any number of secure terminals 16 attach. Network 12 may be a public switched telecommunications network (PSTN) or any other network through which communications between terminals 14 and/or 16 are routed. Terminals 14 and 16 may be distinguished from one another through the use of a network address, such as a phone number or the like. Network 12 may process the network address to determine how to route communications between a calling party and a called party. Alternatively, terminals 14 and 16 may evaluate a network address to determine whether a call is intended for them. Those skilled in the art will appreciate that terminals 14 and 16 may represent conventional telephonic voice communication equipment, but that terminals 14 and 16 may additionally represent other information communication equipment, such as radios, radiotelephones, computers, facsimile machines, video communication equipment, and the like.

Secure terminals 16 may share network 12 with clear terminals 14 because they encrypt and decrypt information passing therebetween. Many cryptographic techniques are known to those skilled in the art, and such techniques are acceptable for use by the present invention. Secure messages and other secure communications employ such cryptographic techniques while a clear or plain-text message or communication session do not, for the most part, employ cryptographic techniques. Those skilled in the art will appreciate that clear terminals 14 communicate only clear information while secure terminals 16 may communicate clear and secure information.

Figure 2:
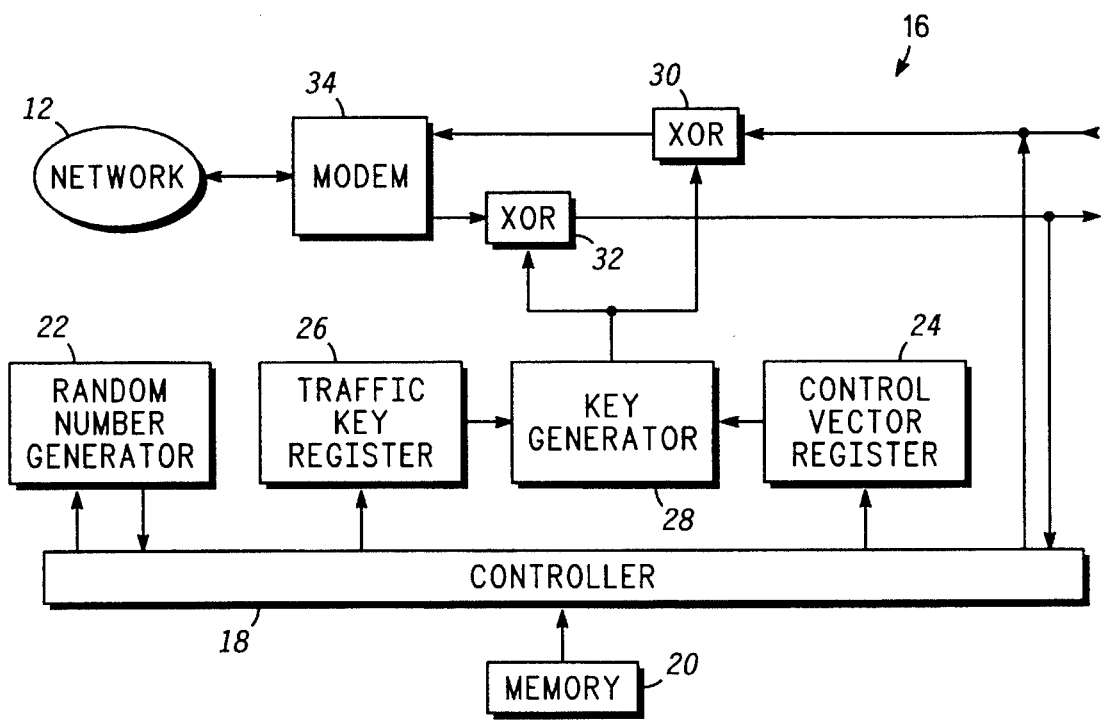
FIG. 2 shows a block diagram of a secure terminal upon which the present invention may be practiced.

FIG. 2 shows a block diagram of a secure terminal 16 upon which the present invention may be practiced. Terminal 16 includes a controller 18, that may include one or more conventional microprocessors (not shown) or other programmable devices. Controller 18 couples to a memory 20. Memory 20 is configured to store programming instructions that define the procedures, processes, and tasks performed by terminal 16. In addition, memory 20 is configured to store variables, tables, lists, and databases that are used by terminal 16. Desirably, memory 20 is configured in accordance with conventional or other security techniques that essentially prevent unwanted meddling with the contents thereof.

Controller 18 additionally couples to a random number generator 22. However, those skilled in the art will appreciate that alternate embodiments may include random number generator 22 within controller 18. In addition, controller 18 couples to a control vector register 24 and a traffic key register 26. Control vector register 24 and traffic key register 26 additionally couple to a key generator 28, and key generator 28 couples to transmit and receive encryption and decryption circuits 30 and 32, respectively. Circuits 30 and 32 may include conventional exclusive OR (XOR) gates to combine transmitted and received information, respectively, with cryptographic keys provided by key generator 28. Circuits 30 and 32 couple to a modem 34, which in turn couples to network 12. As illustrated in FIG. 2, the information provided to and received from circuits 30 and 32 may come from and go to controller 18, respectively. In addition, such information may be routed to and from a vocoder (not shown) or other data processing device.

Figure 3:
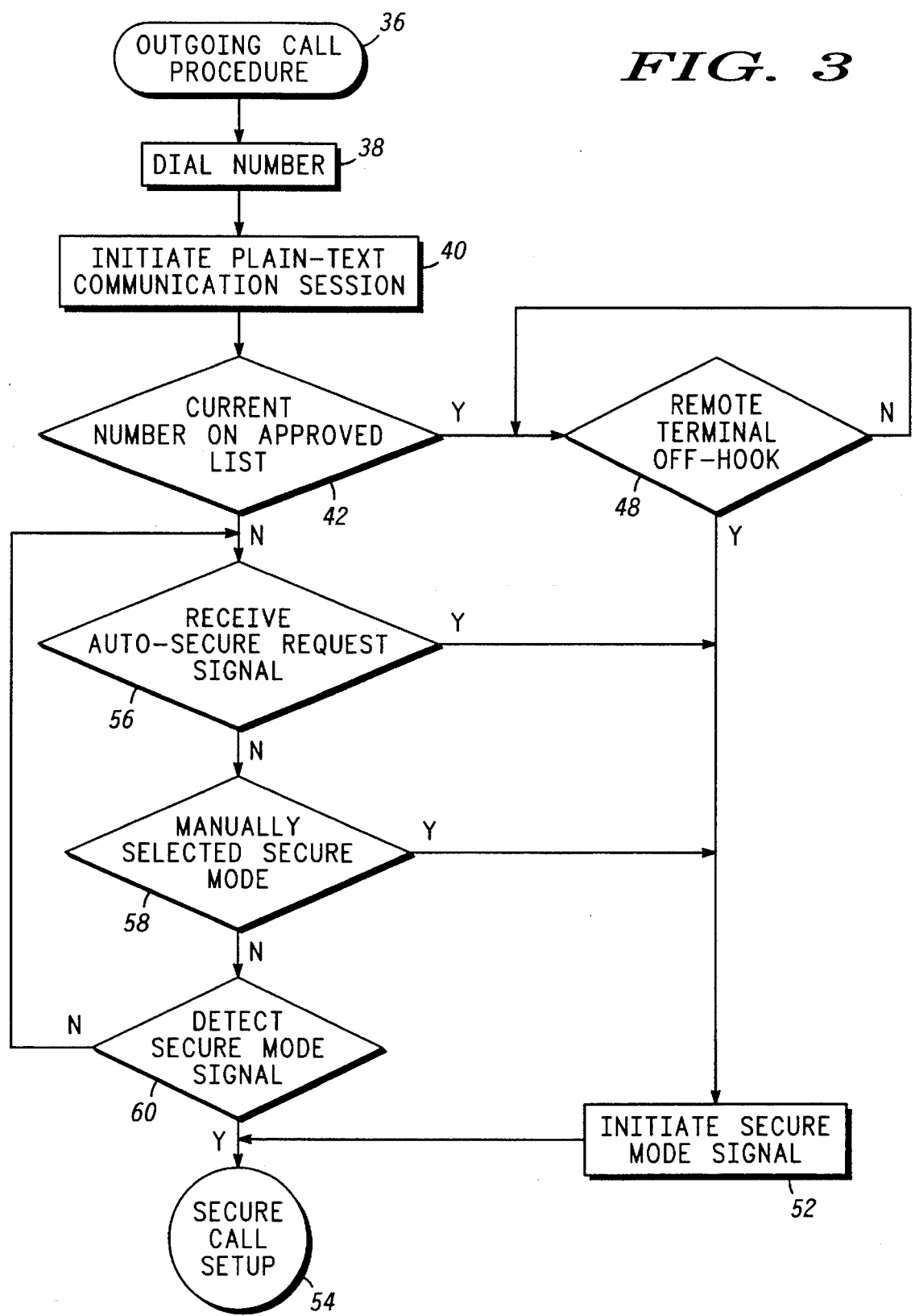
FIG. 3 shows a flow chart of an outgoing call procedure performed by the secure terminal.

FIG. 3 shows a flow chart of an outgoing call procedure 36 performed by a secure terminal 16. Procedure 36 is performed in accordance with programming instructions stored in memory 20 (see FIG. 2). Other procedures which are unrelated to the present invention cause outgoing call procedure 36 to be performed when terminal 16 indicates an attempt to make an outgoing call. For example, procedure 36 may be performed when terminal 16 goes off-hook.

Procedure 36 performs a task 38 to dial a phone number or to cause some other network address to be sent to network 12 (see FIG. 1). Terminal 16 (see FIG. 2) may, for example, obtain this network address from a user of terminal 16 or from its memory 20 after being selected by the user. Next, a task 40 initiates a plain-text communication session. In other words, task 40 attempts to establish a clear call with a remote terminal 14 (see FIG. 1) or 16. When the remote terminal goes off hook or otherwise answers the call, a plain-text communication session commences and continues for a variable duration ending in a conventional fashion. After task 40, a query task 42 determines whether the current number obtained above in task 38 corresponds to a network address included in an approved list.

FIG. 4 shows a block diagram of an approved list 44 maintained in memory 20 (see FIG. 2) of the secure terminal 16. As indicated in FIG. 4, list 44 maintains a collection of network addresses 46. Addresses 46 may be added to and deleted from list 44 by a user of terminal 16 using conventional editing techniques. The user may wish to include network addresses 46 of those other terminals 16 with which the user wishes to automatically engage in secure communications. Thus, when calls are made to this other terminal 16, the local and remote terminals 16 will automatically go secure without requiring either the local user or remote user to initiate the security provisions. While FIG. 4 shows a single approved list 44 for convenience, nothing prevents terminal 16 from incorporating multiple approved lists 44. Multiple approved lists 44 may be desirable, for example, when multiple users use the local terminal 16 and each user needs his or her own approved list 44.

Referring back to FIG. 3, when task 42 determines that the current number is among addresses 46 (see FIG. 4), program control proceeds to a query task 48. Program control waits at task 48 until the remote terminal goes off-hook before proceeding. Of course, procedure 36 may additionally include conventional routines (not shown) that will break a programming loop if the remote terminal fails to go off-hook within a prescribed duration. When the remote terminal goes off-hook, a task 52 initiates a secure mode signal that the local terminal 16 sends to the remote terminal. The secure mode signal may be a distinctive tone or dual tone multi-frequency (DTMF) signal that the remote terminal will recognize as a command to go secure if the remote terminal is a secure terminal 16. After task 52, program control proceeds to a secure call setup procedure 54, which is discussed in more detail below in connection with FIGS. 6–8. Thus, when the network address of the remote terminal is included in approved list 44 (see FIG. 4), terminal 16 automatically initiates secure call setup procedure 54.

When the network address of the remote terminal is not included in approved list 44 (see FIG. 4), program control proceeds from task 42 to a query task 56. Task 56 detects whether the terminal 16 has received an auto-secure request signal from the remote terminal involved in the call. The auto-secure request signal may be a distinctive tone, DTMF signal, or other signal or message that may be communicated over the established clear communication path. The auto-secure request signal differs from the secure mode signal discussed above in connection with task 52. The auto-secure signal serves as a request for the local secure terminal 16 to go secure automatically, rather than as a command to go secure. It indicates that the remote terminal is a secure terminal 16 that is compatible with the local secure terminal 16 and is capable of supporting automatic security initiation. When the auto-secure signal is detected at task 56, procedure 36 again performs task 52 to send the initiate secure mode command signal and then performs secure call setup procedure 54. Thus, when terminal 16 receives an auto-secure request signal, terminal 16 automatically initiates secure call setup procedure 54.

When task 56 fails to detect the auto-secure request signal, a query task 58 is performed to determine whether a user has manually selected the secure mode. The user may make the secure mode selection in a conventional manner, such as by pressing a "secure" button located on terminal 16. When task 58 detects this manual selection of the secure mode, procedure 36 performs task 52 to send the initiate secure mode command signal and then performs secure call setup procedure 54.

When task 58 fails to detect manual selection of the secure mode, a query task 60 determines whether terminal 16 has detected the secure mode command signal sent by the remote terminal 16. In other words, task 60 determines whether the local terminal 16 has received substantially the same signal that it would send if it performed task 52. When task 60 detects the secure mode command signal, procedure 36 interprets the command as an instruction to go secure, and program control proceeds to secure call setup procedure 54.

When task 60 fails to detect the secure mode command signal, program control loops back to task 56 (shown), or alternatively task 58 (not shown), to form a programming loop that includes at least tasks 58 and 60. Procedure 36 continues to perform tasks 58 and 60 throughout the remainder of the plain-text communication session. Thus, nothing prevents terminal 16 from going secure at any time during a communication session. Of course, other routines (not shown) may be included to cause terminal 16 to break this loop when, for example, the communication session ends.

Figure 5:
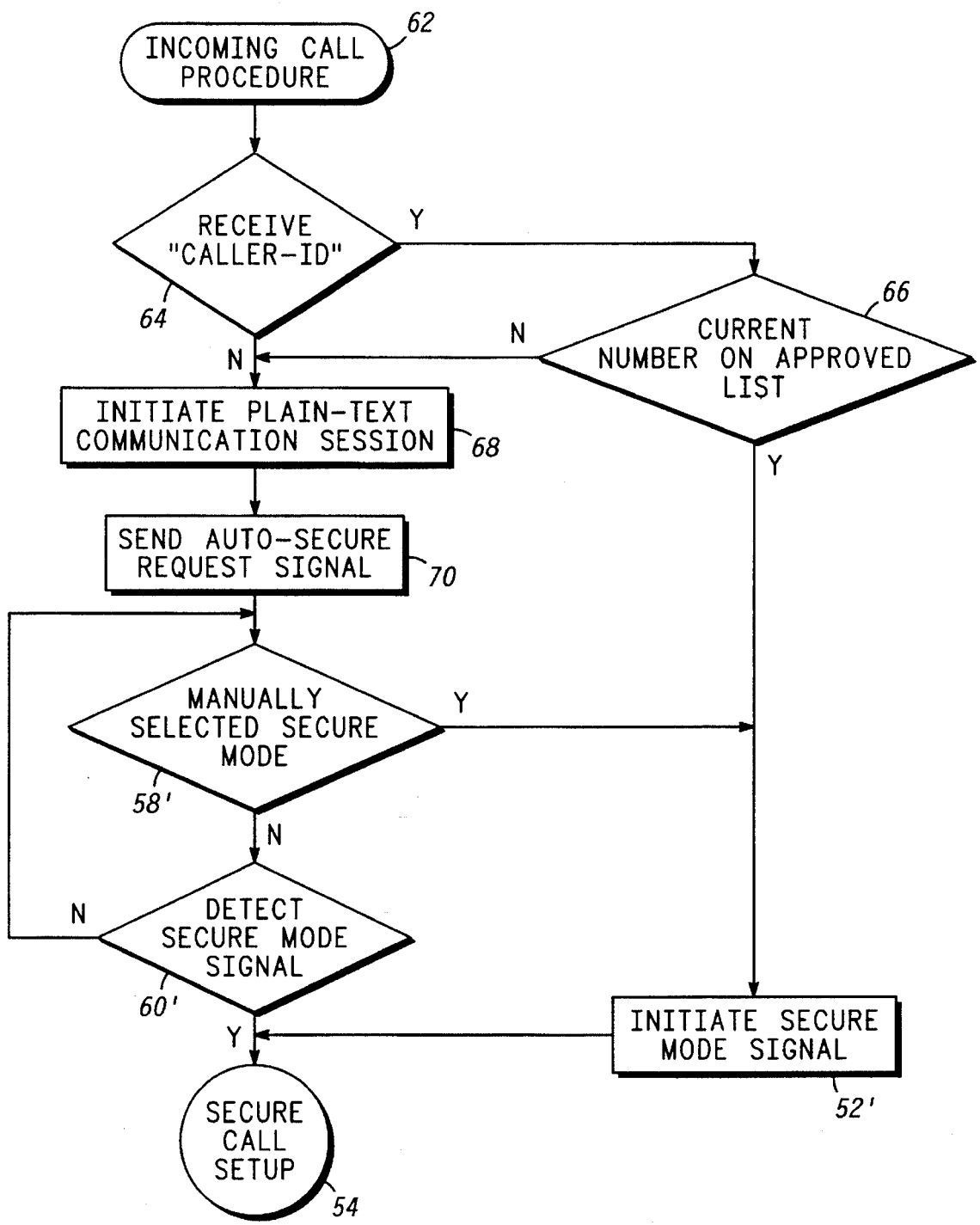
FIG. 5 shows a flow chart of an incoming call procedure performed by the secure terminal.

FIG. 5 shows a flow chart of an incoming call procedure 62 performed by secure terminal 16. Procedure 62 is performed in accordance with programming instructions stored in memory 20 (see FIG. 2). Other procedures which are unrelated to the present invention cause incoming call procedure 62 to be performed when terminal 16 receives a ringing signal or other indication of a call from network 12 (see FIG. 1). Procedure 62 complements procedure 36, discussed above in connection with FIG. 3.

Procedure 62 performs a query task 64 to determine whether Caller ID or similar data has been supplied with the ringing signal from network 12 (see FIG. 1). Caller ID data indicate the identity of the calling party. If Caller ID data are received, a query task 66 determines whether approved list 44 (see FIG. 4) includes this number among network addresses 46 (see FIG. 4). If the number is included in list 44, terminal 16 again automatically attempts to go secure. A task 52' is performed to send the initiate secure mode command signal. Task 52' is substantially the same as task 52 (see FIG. 3). After task 52', program control proceeds to secure call setup procedure 54, which is discussed below in connection with FIGS. 6–8. Thus, when the network address of the remote calling terminal is included in approved list 44 (see FIG. 4), terminal 16 may automatically initiate secure call setup procedure 54.

When task 64 determines that no Caller ID data have been received, a task 68 is performed to initiate a plain-text communication session. Task 68 may be performed when, for example, local terminal 16 goes off-hook. After task 68, a task 70 sends the auto-secure request signal to the remote terminal. As discussed above, this signal may be interpreted by the remote terminal as a request for the remote terminal to automatically initiate secure communications. However, if the remote terminal is not compatible with local terminal 16, such as if the remote terminal is a clear terminal 14 (see FIG. 1) or a secure terminal 16 that does not support going secure automatically, this request may be ignored.

After task 70, a query task 58' is performed to determine whether a user has manually selected the secure mode. Task 58' is substantially the same as task 58 (see FIG. 3). When task 58' detects the manual selection of the secure mode, procedure 62 performs task 52' to send the initiate secure mode command signal and then procedure 62 performs secure call setup procedure 54.

When task 58' fails to detect manual selection of the secure mode, a query task 60' determines whether terminal 16 has detected the secure mode command signal sent by the remote terminal 16. Task 60' is substantially the same as task 60 (see FIG. 3). When task 60' detects the secure mode command signal, procedure 62 interprets the command as an instruction to go secure, and program control proceeds to secure call setup procedure 54.

When task 60' fails to detect the secure mode command signal, program control loops back to task 58' to form a programming loop that includes tasks 58' and 60'. Procedure 62 continues to perform tasks 58' and 60' throughout the remainder of the plain-text communication session. Of course, other routines (not shown) may be included to cause terminal 16 to break this loop when, for example, the communication session ends.

Figure 6:
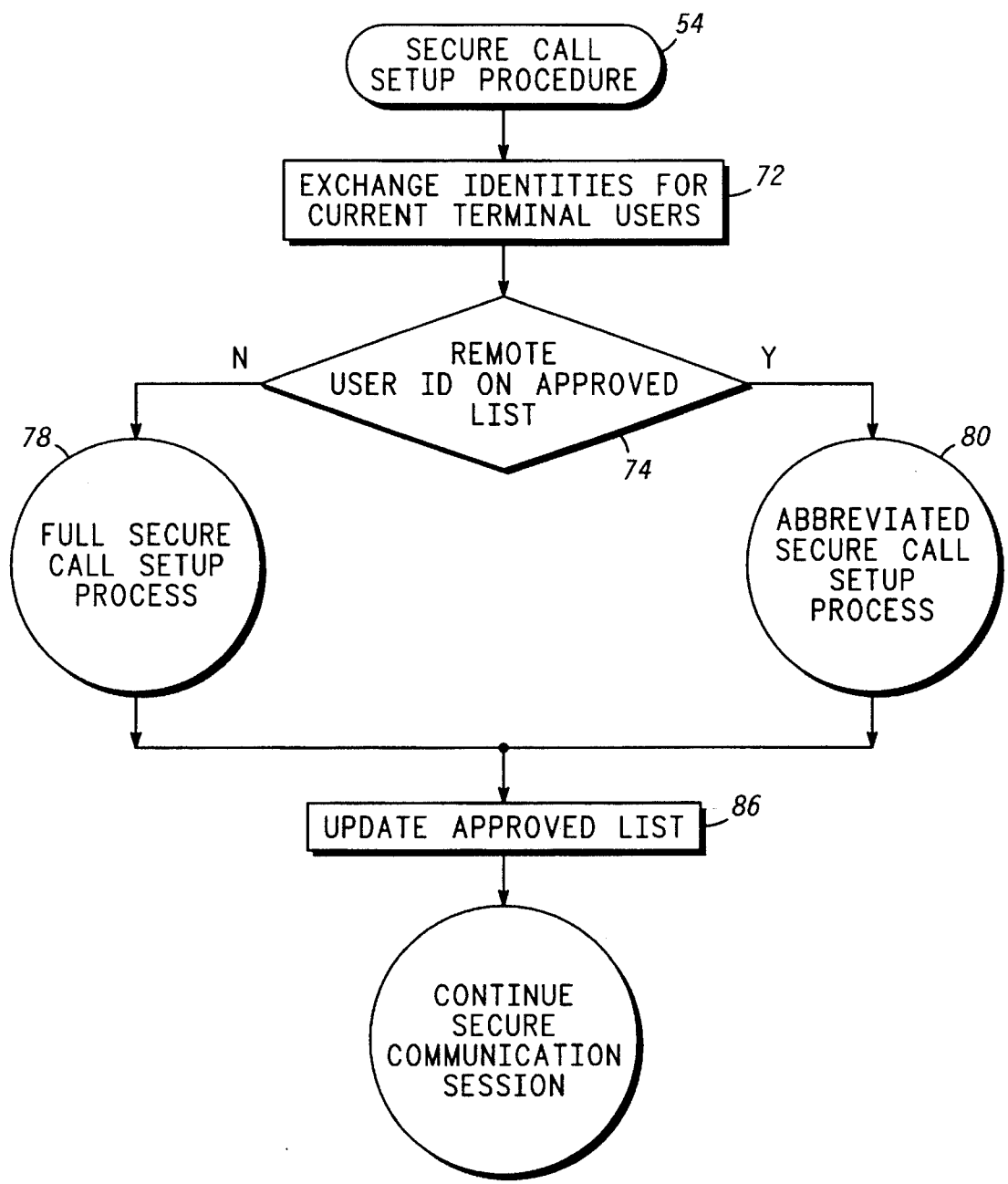
FIG. 6 shows a flow chart of a secure call setup procedure performed by the secure terminal.

FIG. 6 shows a flow chart of secure call setup procedure 54. As discussed above, terminal 16 performs procedure 54 when either party to a call causes the call to go secure. Procedure 54 is performed to cause terminal 16 to go secure, whether the secure mode has been initiated automatically or manually. Furthermore, procedure 54 applies regardless of whether terminal 16 is a calling or a called party, and regardless of whether the local terminal 16 or the remote terminal 16 initiated the secure mode.

Procedure 54 performs a task 72 to exchange user-identities for the current users of the local and remote terminals 16 involved in the call. The user-identities exchanged in task 72 need not be the network addresses discussed above in connection with FIGS. 3 and 5. Rather, different users may be allowed to use secure terminals 16, and the user-identities may identify specific users of terminals 16. Desirably, task 72 is performed through a data exchange. Thus, task 72 may additionally train modems 34 (see FIG. 2) for local and remote terminals 16 so that terminals 16 may successfully exchange user-identity data. The user-identity data may be obtained from key devices that users place in terminals 16, or in any other manner conventional in the art. For example, the user-identity data may also be hard coded in a memory of the terminal or received from a key certification authority.

After task 72, a query task 74 determines whether the current user-identity obtained above in task 72 corresponds to a user-identity 76, shown in FIG. 4, included in approved list 44. User-identities 76 may be, but need not be, associated with network addresses 46. Each network address 46 may have any number of user-identities 76 associated therewith. Referring back to FIG. 6, when task 74 determines that the current user-identity is not included on approved list 44, procedure 54 performs a full secure call setup process 78. On the other hand, when task 74 determines that the current user-identity obtained in the exchange of task 72 corresponds to a user-identity 76 from list 44, procedure 54 performs an abbreviated secure call setup process 80.

One difference between processes 78 and 80 is that abbreviated secure call setup process 80 may be performed faster than full secure call setup process 78. When approved list 44 includes data describing the other party involved in the call, secure call setup procedure 54 may be completed relatively fast. Referring to FIG. 4, these data include user-identity data 76 along with authentication information 82 and traffic keys 84 which are associated with user identities 76 in a one-to-one correspondence. These data are included in approved list 44 as a result of a prior secure communication session with the same remote user. If no prior secure communication session has taken place, then such data are not included in approved list 44, task 74 will fail to find correspondence between the current user-identity and an approved user-identity 76 from list 44, and full secure call setup process 78 will be performed.

Secure call setup processes 78 and 80 are discussed in detail below in connection with FIGS. 7 and 8, respectively. A secure communication session will have commenced by the completion of process 78 or 80. This means that the local and remote terminals have authenticated the other users, cryptographic keys have been exchanged, and encrypted communications may be successfully decrypted. Then, a task 86 updates approved list 44 with data obtained from the remote terminal 16 during the performance of a secure call setup process 78 or 80. Such data include a new traffic key 84 (see FIG. 4) and may include new authentication information 82 (see FIG. 4). The new traffic key 84 will be used as a cryptographic key for secure communications which may take place in a future secure communication session that can be setup through abbreviated secure call setup process 80.

After task 86, program control continues the secure communication session. The secure communication session may continue for a duration that varies from call to call. During the secure communication session, session data are encrypted and decrypted using a traffic key. If abbreviated secure call setup process 80 was successfully performed, this traffic key was obtained from approved list 44 (see FIG. 4). If full secure call setup process 78 was performed, this traffic key is a new traffic key that was generated by terminals 16 during process 78. The secure communication session may continue until the call terminates (not shown).

Figure 7:
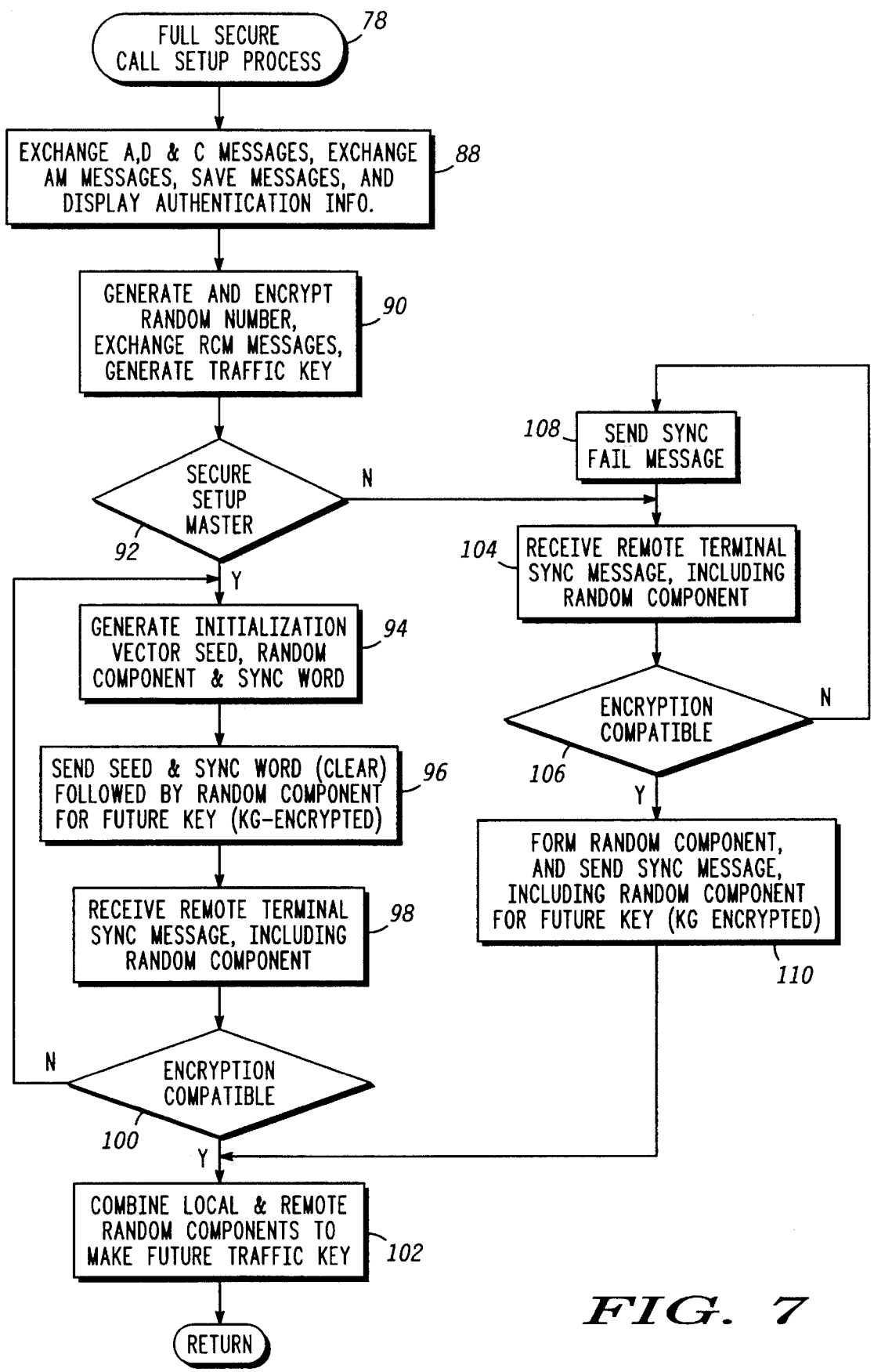
FIG. 7 shows a flow chart of a full secure call setup process performed by the secure terminal.

FIG. 7 shows a flow chart of full secure call setup process 78. Process 78 causes local terminal 16 to engage in a public key exchange with the remote terminal 16.

In particular, process 78 performs a task 88 to exchange access, domain, and capabilities (A, D, & C) messages in the clear. Likewise, task 88 causes the terminals 16 to exchange authentication messages (AM) and display authentication information. This authentication information is desirably saved for possible storage later in approved list 44 (see FIG. 4). At least a portion of the AM messages may be encrypted and decrypted using a public key encryption algorithm that is performed substantially by controller 18 (see FIG. 2). Thus, the encryption and decryption functions may be performed relatively slowly. A, D, & C and AM messages are known in the art and not discussed further herein.

After task 88, a task 90 generates and encrypts a random number for use as a component of a traffic key that will be used in encrypting and decrypting session data for the upcoming secure communication session. In addition, task 90 exchanges random component messages (RCM) that communicate these random number components with the remote terminal 16, and generates a traffic key from the local and remote traffic key components. The encryption and complementary decryption of the random components are performed using public keys supplied in the AM message communicated during task 88. This encryption and complementary decryption may be performed substantially by controller 18 (see FIG. 2) in a manner that is relatively slow. RCM messages are known in the art and not discussed further herein.

After task 90, a query task 92 determines whether local terminal 16 is a master or slave for the purposes of the secure call setup process. Whether local terminal 16 is a master or slave depends upon whether local terminal 16 was the terminal 16 that initiated going secure. It does not matter which terminal 16 is designated the master or slave for secure call setup processes so long as both terminals 16 agree on the designation. If the local terminal 16 is the master, then the remote terminal 16 is the slave, and vice-versa.

When terminal 16 is a master, a task 94 generates an initialization vector seed, another random component for a future traffic key (see FIG. 4), and a synchronization check word. The seed is used to generate an initialization control vector for key generator 28 (see FIG. 2), and the traffic key generated above in task 90 is used as a cryptographic key for key generator 28. A synchronization check word is generated by encrypting a known pattern using this seed and traffic key.

As indicated at a task 96, the seed and synchronization check word are sent to the remote terminal 16. Preferably in the same message, the random component generated above in task 94 follows the seed and check word. The seed and sync word are sent in the clear. However, the random component is encrypted using the initialization control vector and traffic key supplied to key generator 28. Key generator (KG) Encryption and complementary decryption may be performed almost instantaneously when compared to public key encryption that takes place in controller 18 (see FIG. 2). Thus, the encryption, transmission, and decryption of the random component takes very little time.

After task 96, program control waits at a task 98 until the remote terminal's sync message is received. This sync message includes a KG-encrypted random component for a future traffic key and indicates whether the remote terminal 16 found KG-encryption to be compatible. A query task 100 determines whether encryption is compatible for the local terminal 16. In other words, task 100 verifies that the local and remote terminals are cryptosynchronized. If cryptosynchronization is not verified at task 100, program control loops back to task 94 to attempt synchronization again. Although not shown in FIG. 7, those skilled in the art will appreciate that other routines may be included to limit the number of such attempts.

When task 100 determines that encryption is compatible between the local and remote terminals 16, the secure communication session begins. At this point, a task 102 combines the local random component generated in task 94 (or task 110 described infra) with the remote random component received in task 96 (or task 104 described infra) to generate a future traffic key, and program control exits full secure call setup process 78 and proceeds to task 86 (see FIG. 6). As described above, task 86 saves this future traffic key in approved list 44 (see FIG. 4) for use in a future performance of abbreviated secure call setup process 80 (see FIG. 6).

Referring back to task 92, when the local terminal 16 is a slave, program control waits at a task 104 until the crypto-sync message is received from the remote terminal 16. While local terminal 16 is waiting in task 104, the remote terminal 16 performs tasks 94 and 96, discussed above.

Thus, the crypto-sync message that the local terminal 16 eventually receives includes a random component of a future traffic key, and this random component is KG-encrypted.

After task 104, a query task 106 determines whether encryption between the remote and local terminals 16 is compatible. In other words, task 106 verifies crypto-synchronization. If synchronization is not verified, a task 108 is performed to send a sync-fail message to the remote terminal 16, and program control returns to task 104 to await the receipt of another crypto-sync message. Although not shown in FIG. 7, additional routines may be included to limit the iterations through a loop consisting of tasks 104, 106, and 108.

When task 106 determines that encryption is compatible between the local and remote terminals 16, the secure communication session begins. Task 110 is substantially the same as tasks 94 and 96. A task 110 forms a random component of a future traffic key. In addition, task 110 sends a crypto-synchronization message to the remote terminal 16 and includes this random component in the message. Preferably, this random component is KG-encrypted, as are all subsequent session data. This synchronization message is received while the remote terminal 16 performs task 98, discussed above. After task 110, program control proceeds to task 102. Task 102 combines the local random component generated in task 110 with the remote random component received in task 104 to generate a future traffic key, and program control exits full secure call setup process 78 and proceeds to task 86 (see FIG. 6). As discussed above, task 86 saves this future traffic key in approved list 44 (see FIG. 4) for use in a future performance of abbreviated secure call setup process 80 (see FIG. 6).

Figure 8:
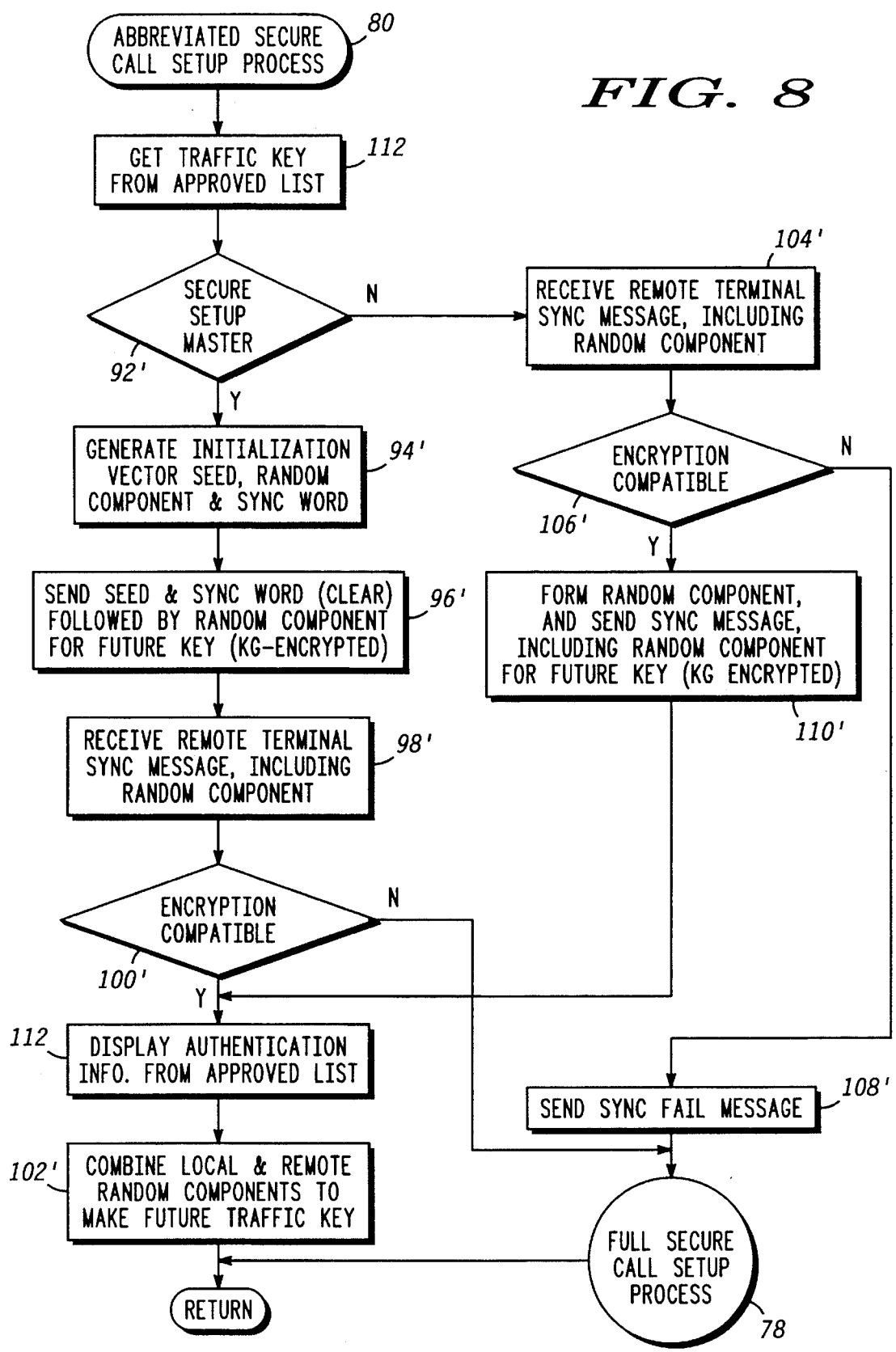
FIG. 8 shows a flow chart of an abbreviated secure call setup process performed by the secure terminal.

FIG. 8 shows a shows a flow chart of abbreviated secure call setup process 80. Abbreviated secure call setup process 80 omits the public key encryption steps discussed above in connection with full secure call setup process 78 (see FIG. 7). Instead, process 80 performs a task 112 to obtain a traffic key from approved list 44 (see FIG. 4). The particular traffic key obtained from list 44 is the one associated with an approved user-identity 76 that corresponds to the current user-identity obtained in task 72 (see FIG. 6). In comparing full secure call setup process 78 with abbreviated secure call setup process 80, process 80 obtains a traffic key almost instantly, whereas process 78 obtains a traffic key after a time consuming exchange of messages that involves relatively slow encryption and decryption functions.

After task 112, abbreviated secure call setup process 80 follows a program flow similar to portions of full secure call setup process 78 (see FIG. 7). In particular, a query task 92' is similar to task 92 (see FIG. 7) and determines whether the local terminal 16 is the master or slave for this secure call setup process. If the local terminal is a master, process 80 performs tasks 94', 96', 98', and 100' which are similar to tasks 94, 96, 98, and 100, respectively, discussed above in connection with FIG. 7. If the local terminal is a slave, process 80 performs tasks 104', 106', 108', and 110', which are similar to tasks 104, 106, 108, and 110, respectively, discussed above in connection with FIG. 7.

However, abbreviated secure call setup process 80 differs from full secure call setup process 78 (see FIG. 7) in a couple of additional matters. Full secure call setup process 78 implements programming loops so that if encryption between the local and remote terminals 16 is found to be incompatible an additional attempt to achieve crypto-synchronization is be made. On the other hand, abbreviated secure call setup process 80 preferably passes program control from tasks 100' and 108' over to full secure call setup process 78 when encryption is deemed incompatible.

Moreover, when encryption is deemed compatible between the local and remote terminals, abbreviated secure call setup process 80 passes program control from tasks 100' and 110' to a task 112. Task 112 displays authentication information 82 (see FIG. 4) obtained from approved list 44 (see FIG. 4) at the terminal 16. The particular authentication information 82 obtained in task 112 is associated with the approved user-identity 76 that corresponds with the current user-identity obtained in task 72 (see FIG. 6). After task 112, abbreviated secure call setup process 80 performs a task 102' which is similar to task 102 (see FIG. 7) in full secure call setup process 78. Task 102' makes the traffic key that may be used for a future secure communication session between the two users of the local and remote terminals 16. After task 102' or upon completion of full secure call setup process 78, program control returns to task 86 (see FIG. 6). As discussed above, task 86 saves the future traffic key in approved list 44 (see FIG. 4) for use in a future performance of abbreviated secure call setup process 80 (see FIG. 6).

In summary, the present invention provides an improved secure communication setup method. In certain situations, the present invention allows secure terminals to automatically go secure. For example, the present invention may automatically initiate a secure communication session when a phone number for an outgoing or incoming call matches a phone number included in an approved list. In addition, the present invention may include an auto-secure signal that is automatically sent from one party to a call and is interpreted as a request for another party to a call to automatically initiate a secure call setup procedure. Furthermore, the present invention may include an abbreviated secure call setup procedure that is performed in a fraction of the time required for a full secure call setup procedure. The abbreviated secure call setup procedure relies upon the protection of security provisions provided by a prior secure communication session to generate and exchange cryptographic keys for use in a subsequent secure communication session.

The present invention has been described above with reference to preferred embodiments. However, those skilled in the art will recognize that changes and modifications may be made in these preferred embodiments without departing from the scope of the present invention. For example, the particular order and organization of the tasks, processes, and procedures discussed above may be altered without substantially changing the jobs performed. These and other changes and modifications which are obvious to those skilled in the art are intended to be included within the scope of the present invention.

What is claimed is:

1. A method of engaging in a secure communication session with one of a plurality of remote terminals, said method comprising the steps of:

determining whether a prior secure communication session has been conducted with one of said plurality of remote terminals;

performing a first secure call setup process including a plurality of public key encryption steps when no prior secure communication session has been conducted with said one remote terminal; and performing a second secure call setup process without said plurality of public key encryption steps when a prior secure communication session has been conducted with said one remote terminal, said second secure call setup process being accomplished more quickly than said first secure call setup process.

2. A method of engaging in a secure communication session as claimed in claim 1 additionally comprising the steps of:

maintaining a list in which approved user-identities are associated with approved traffic keys, said approved user-identities serving to identify at least some users of said remote terminals;

initiating a plain-text communication session with said one remote terminal;

receiving a current identity from said one remote terminal;

determining whether said current identity corresponds to one of said approved user-identities from said list; and effecting said second secure call setup process performing step when said current identity corresponds to one of said approved user-identities.

3. A method of engaging in a secure communication session as claimed in claim 2 additionally comprising the step of sending an auto-secure signal to said one remote terminal, said auto-secure signal serving to request said one remote terminal to automatically send said current identity.

4. A method of engaging in a secure communication session as claimed in claim 3 additionally comprising the step of encrypting session data using one of said approved traffic keys that is associated in said list with said one approved user-identity to which said current identity corresponds when said current identity corresponds to one of said approved user-identities.

5. A method of engaging in a secure communication session as claimed in claim 4 additionally comprising the steps of:

determining, prior to said encrypting step, whether use of said one approved traffic key is compatible with encryption carried out at said one remote terminal; and effecting said first secure call setup process performing step when use of said one approved traffic key is not compatible.

6. A method of engaging in a secure communication session as claimed in claim 4 additionally comprising the steps of:

generating a future approved traffic key; and updating said list to associate said future approved traffic key with said one approved user-identity to which said current identity corresponds.

7. A method of engaging in a secure communication session as claimed in claim 6 wherein said generating step comprises the steps of:

receiving a secure data message from said one remote terminal; and forming said future approved traffic key in response to said data message.

8. A method of engaging in a secure communication session as claimed in claim 6 wherein:

said secure communication session occurs during said encrypting step;

said communication session continues for a variable duration; and said generating and updating steps occur approximately at the beginning of said variable duration.

9. A method of engaging in a secure communication session as claimed in claim 2 wherein said method additionally comprises the step of effecting said first secure call setup process performing step when said current identity does not correspond to one of said approved user-identities, and said first secure call setup process performing step comprises the steps of:

obtaining a new traffic key; and encrypting session data using said new traffic key.

10. A method of engaging in a secure communication session as claimed in claim 9 wherein said obtaining step comprises the step of engaging in a public key exchange to generate said new traffic key.

11. A method of engaging in a secure communication session as claimed in claim 1 additionally comprising the steps of:

maintaining a list of approved network addresses;

obtaining a current network address for said one remote terminal;

determining whether said current network address corresponds to one of said approved network addresses; and automatically effecting one of said first secure call setup process performing and said second secure call setup process performing steps when said current network address corresponds to one of said approved network addresses.

12. A method of engaging in a secure communication session as claimed in claim 1 additionally comprising the steps of:

detecting the receipt of an auto-secure signal from said one remote terminal; and interpreting said auto-secure signal as a request to automatically establish a secure communication session.

* * * * *